Figure 1:
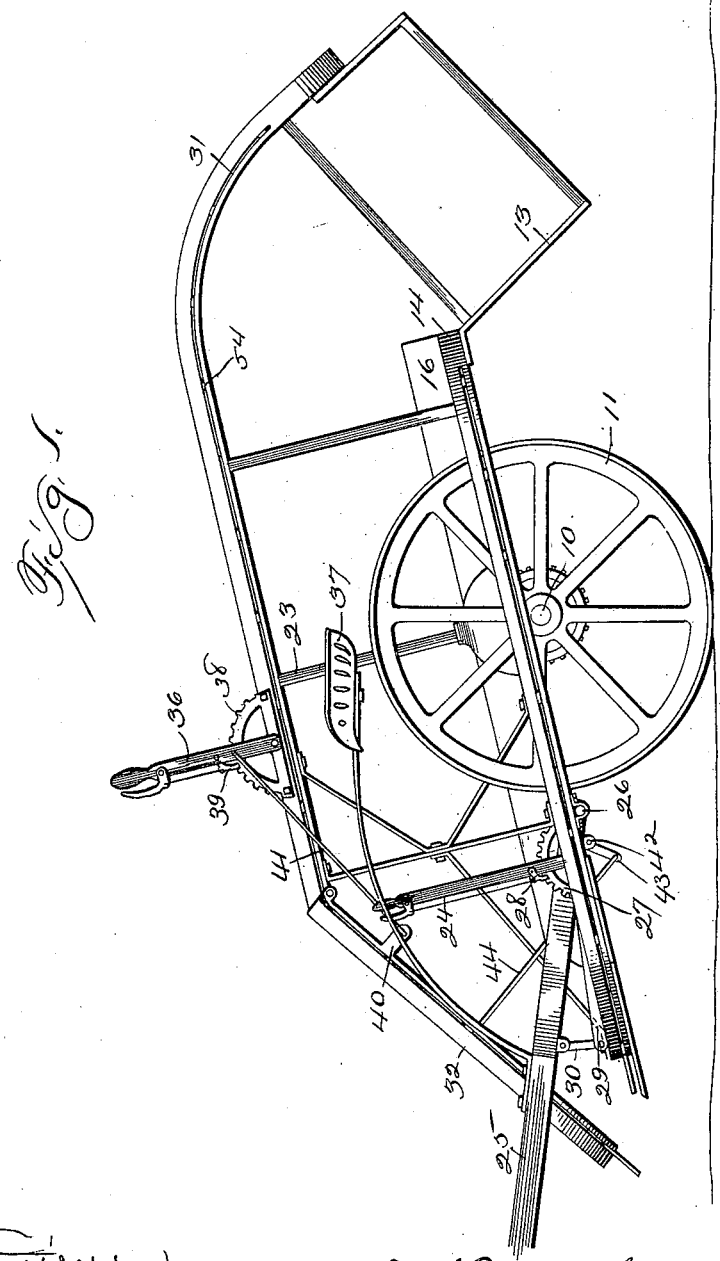

No. 641,288. Patented Jan. 16, 1900.
W. H. GRAY.
CORN HARVESTER.
(Application filed Nov. 26, 1897.)

(No Model.) 4 Sheets—Sheet 1.

No. 641,288. Patented Jan. 16, 1900.
W. H. GRAY.
CORN HARVESTER.
(Application filed Nov. 26, 1897.)
(No Model.) 4 Sheets—Sheet 4.

United States Patent Office.

WILLIAM HENRY GRAY, OF EDDYVILLE, IOWA, ASSIGNOR TO THE KEYSTONE MANUFACTURING COMPANY, OF ROCK FALLS, ILLINOIS.

CORN-HARVESTER.

SPECIFICATION forming part of Letters Patent No. 641,288, dated January 16, 1900.

Application filed November 26, 1897. Serial No. 659,800. (No model.)

*To all whom it may concern:*

Be it known that I, WILLIAM HENRY GRAY, a citizen of the United States, residing at Eddyville, in the county of Wapello and State of Iowa, have invented new and useful Improvements in Corn-Harvesters, of which the following is a specification.

This invention relates to and consists in certain improvements upon a corn-harvester invented by me and fully described in my United States Patent No. 602,659, issued April 19, 1898. Attention is directed to that patent for making clear certain features which are merely referred to and not described in the following specification.

My object in this invention is, primarily, to provide means whereby the stalks of corn may be carried by the machine in a vertical position to the rear end of the machine and then the tops of the stalks be carried rearwardly a considerable distance farther than the butts and held in a shock-former, in which the shock stands at an angle of about forty-five degrees, so that by thus carrying the tops of stalks rearwardly beyond the butts and laying the stalks at a considerable incline any broken or bent stalks will be laid parallel with the straight ones and a compact shock formed, and, furthermore, a "square-butted" shock will be formed, because all of the said butts rest upon the bottom of the shock-holder.

A further object is to provide means whereby the forward end of the upper conveyer may be moved upwardly and downwardly by the operator, so that the conveyer-fingers carried thereby may be made to pick up cornstalks that have been blown down and lie close to the ground.

A further object is to provide means whereby the bulk of the weight of the machine is thrown directly over one of the traction-wheels, so that the tongue of the machine may be placed to one side of the center and side draft be avoided.

My invention consists, essentially, in the construction, arrangement, and combination of parts whereby the stalks are carried by the conveyer into a holder standing at an angle of about forty-five degrees.

My invention consists, further, in the construction of the endless conveyer-chain.

My invention consists, further, in the construction, arrangement, and combination, in a machine of this class, of the means for raising and lowering the forward end of the upper conveyer.

My invention consists, further, in certain details of construction, arrangement, and combination whereby the weight of the machine is thrown to one side of the center and in certain other details of construction hereinafter more fully set forth, pointed out in my claims, and illustrated in the accompanying drawings, in which—

Figure 2:
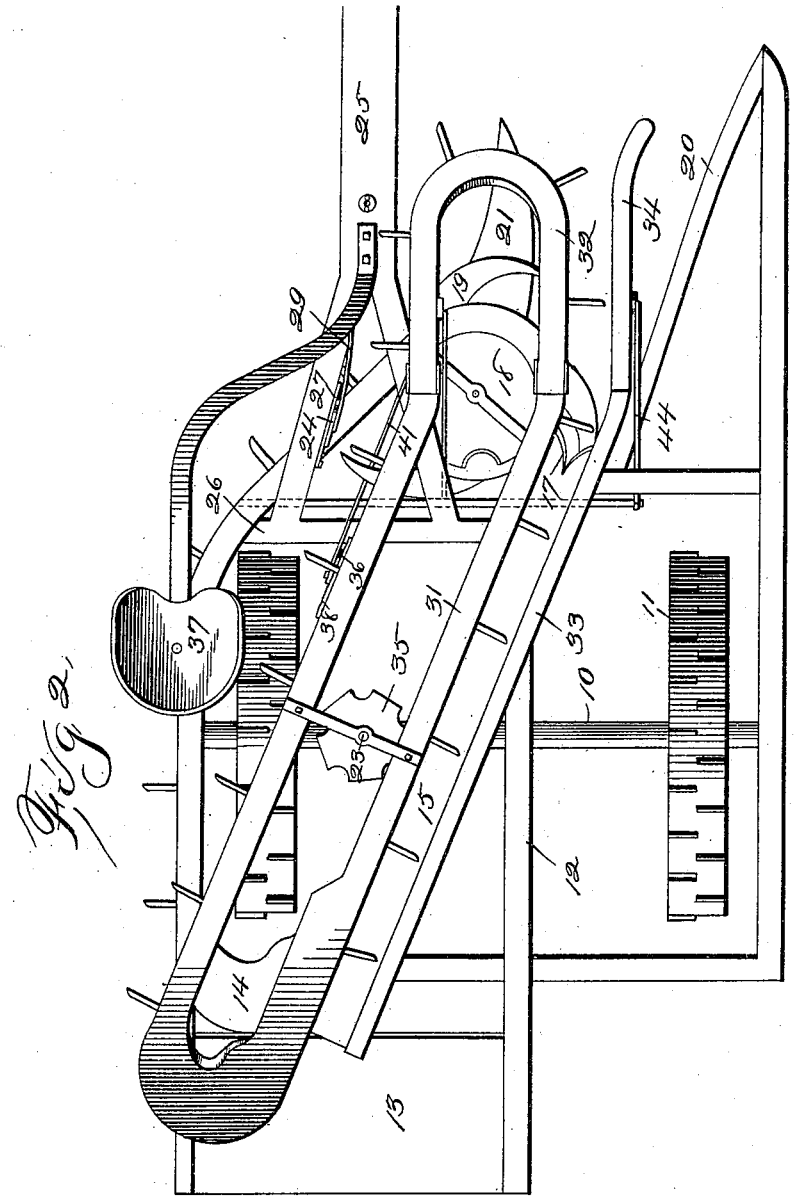
Figure 3:
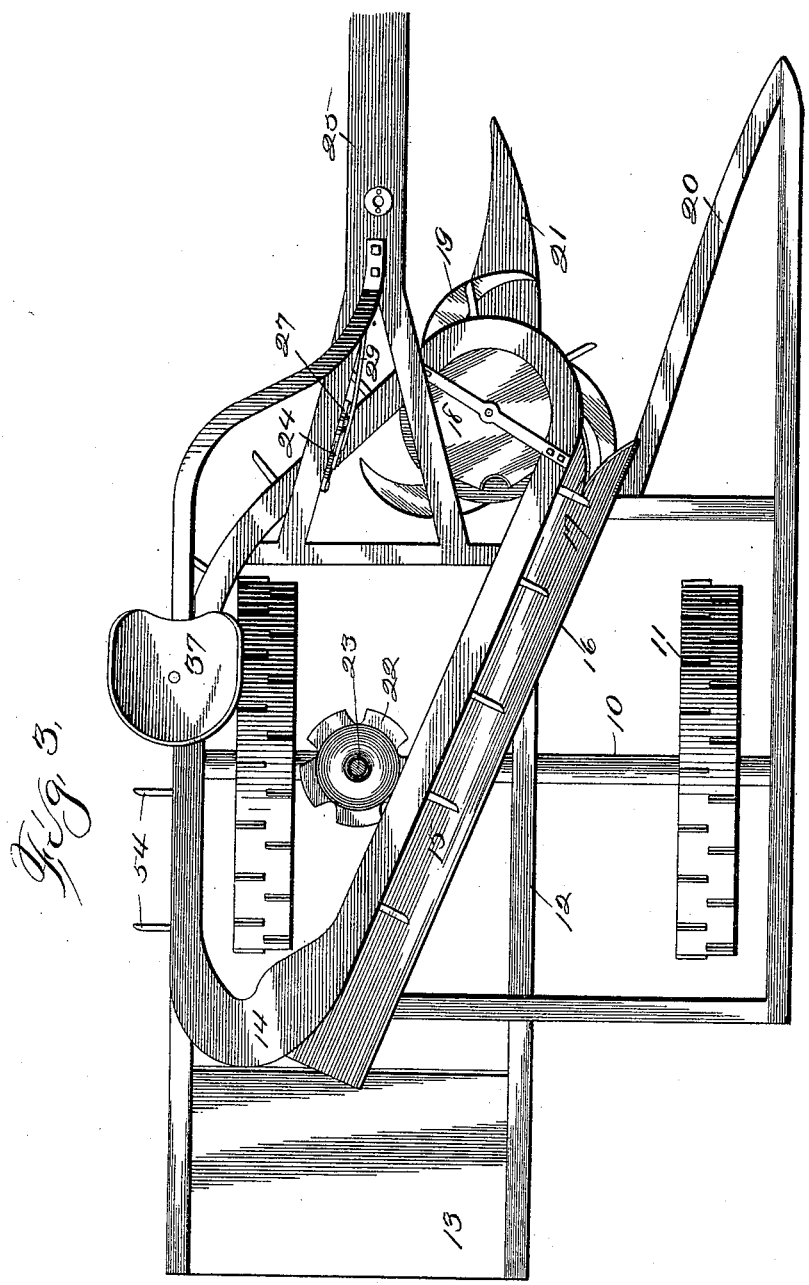
Figure 4:
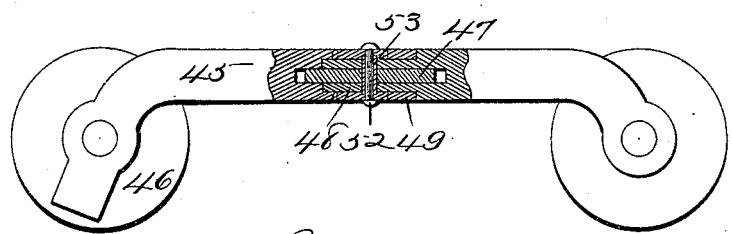
Figure 5:
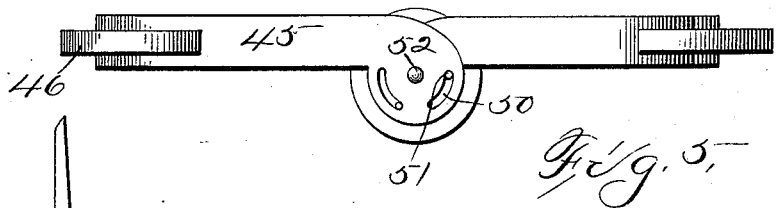
Figure 6:
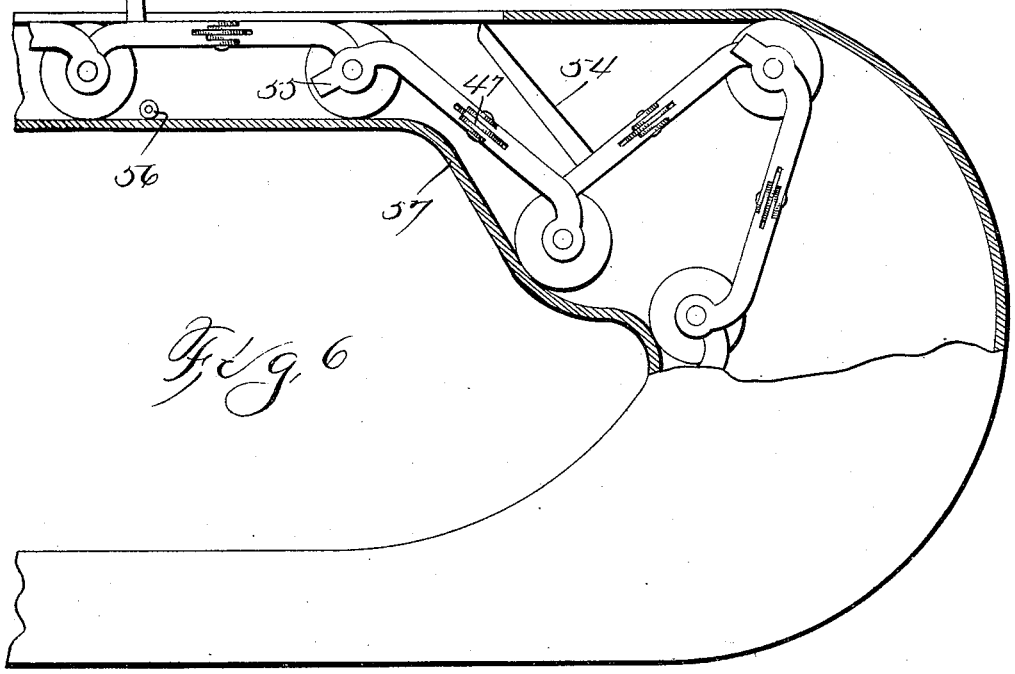

Figure 1 shows a side elevation of the complete machine. Fig. 2 shows a top or plan view of the same. Fig. 3 shows a top or plan view of the machine with the upper track and accompanying parts removed. Fig. 4 shows a top or plan view of one of the links of the endless conveyer-chain, the central portion of which is broken away to show certain details of construction. Fig. 5 shows an edge view of the same link; and Fig. 6 shows a top or plan view of the rear turn of the upper track, parts of which are broken away to show the endless conveyer-chain therein.

Referring to the accompanying drawings, the reference-numeral 10 is used to indicate the axle of the driving-wheels, 11 the driving-wheels fixed thereto, and 12 the machine-frame mounted upon this axle. At the rear end of this frame is a receptacle 13, adapted to receive the cornstalks and retain them at an angle of about forty-five degrees relative to a perpendicular line through the receptacle, into which the stalks successively drop by force of gravity as they pass the ends of the guides 16 to be collected into gavels and shocks and bound before removing them.

The reference-numeral 14 is used to indicate the lower track in which the endless conveyer is mounted. This track is constructed and arranged in a similar manner to the one shown and described in my aforesaid former patent, with the exception that the part in which the conveyer moves rearwardly extends diagonally across the machine, the rear turn being arranged at a point immediately in the rear of one of the traction-wheels, and that portion of the track in which the endless conveyer moves forwardly is so shaped as to pass on the outside of the traction-wheel. A laterally-projecting support 15 is formed on or fixed to that portion of the track on which the conveyer moves rearwardly, and at the outer edge of this support is a raised guide 16 to support and direct the butts of the stalks when they are being moved rearwardly. A stationary knife 17 is secured to the forward turn of the lower track, and a disk 18 is mounted in the forward turn of the track to be rotated by means of the conveyer-chain. 19 indicates cutters fixed to this disk and designed to coact with the stationary cutter 17 to sever cornstalks. The reference-numeral 20 indicates an arm on the side of the frame opposite from the tongue, designed to direct cornstalks toward the cutting mechanism, and 21 indicates a curved arm on the opposite side of the cutting mechanism to pick up stalks and direct them toward the cutting mechanism. The endless conveyer in this lower track is driven by means of a disk 22, fixed to a shaft 23, which is geared to the axle 10. These cutting and driving mechanisms last above referred to are fully shown and described in my above-noted patent.

The reference-numeral 24 indicates a lever fulcrumed to the machine-frame. A segmental rack 27 is also fixed to the frame and is engaged by a pawl 28, connected with this lever 24.

29 indicates an arm connected with the lower end of the lever 24 and projecting forwardly therefrom, and 30 indicates a link connecting this arm with the under side of the tongue 25, which in turn is pivoted to the machine-frame at 26, so that when the lever 24 is moved forwardly and backwardly the forward end of the lower track will be raised and lowered relative to the ground, and the rear end of the tongue will be moved up and down with said track, while the movements of the front end of the tongue will be restricted by its connection with a neck-yoke in front of horses hitched to the neck-yoke and machine, as required to advance and operate it. By this means the stalks may be cut at any desired height from the ground.

The upper conveyer-track differs from the one in my previous patent in that its two sides are parallel with each other and extend diagonally across the machine. At its rear end this upper track is curved downwardly at 31, as clearly illustrated in Fig. 1. At the forward end of this upper track a portion (indicated by the reference-numeral 32) is hinged to the main portion of the track and extends forwardly in a line parallel with the line of advance of the machine.

33 indicates a guide-rail supported upon the machine-frame parallel with that part of the upper track in which the conveyer moves rearwardly and a short distance therefrom. The forward end of this guide-rail (indicated by the reference-numeral 34) is pivoted and extends parallel with the forward end of the conveyer-track. The conveyer-chain in this upper track is driven by means of the disk 35, which is fixed to the upper end of the shaft 23.

I have provided means for raising and lowering the forward end of the upper conveyer-track and also the forward end of the guide 34 in unison, as follows:

36 indicates a lever fulcrumed to the upper track adjacent to the driver's seat 37, and 38 is a segmental rack fixed to the track.

39 indicates a pawl connected with the lever and in engagement with the rack.

40 indicates an arm formed on or fixed to the forward end portion of the upper track and projecting downwardly therefrom. A rod 41 is connected with this arm and with the lever 36, so that as the said lever is moved forwardly and backwardly the forward end of the upper track will be raised or lowered.

42 indicates a rock-shaft mounted beneath the lower track and in the rear of the cutting mechanism, and 43 indicates crank-arms formed on or fixed thereto. 44 indicates pitmen connected with these crank-arms and with the forward end of the upper track and also with the forward end of the guide-rail 34. It is obvious that a movement of the forward end of the upper track will also move the said guide-rail in unison therewith.

The conveyer-chain in the upper track differs, essentially, from that shown in my hereinbefore-noted patent in that in the central portion of each link a joint of peculiar construction is formed, which will permit the links of the chain to bend or fold in a direction at right angles to the movement of which those shown in my former patent were capable. Each link is composed of two independent end portions 45. The outer end of each of these parts 45 is bifurcated in a horizontal plane to admit a wheel 46, and the inner ends of each of these parts 45 is bifurcated in a vertical plane, or a plane at right angles to that of the ends, to admit a wheel 47. These wheels 46 are arranged to engage the sides of the track and hold the chain in proper position within the narrow portion of the track, and the wheels 47 are designed to engage the bottom of the track and support the chain above the bottom. Each link is composed of two parts. The bifurcation at the inner end of one part is of such a size as to admit the wheel 47, and the disk-shaped parts 48 are made to overlap this wheel. The other part of the link is provided with a bifurcation large enough to overlap the parts 48 of the adjacent portion of the link, and the disk-shaped parts 49 are formed thereon. In each of these disk-shaped parts 49 the segmental concentric slots 50 are formed, and on each of the segmental parts 48 two outwardly-projecting pins 51 are provided to extend through the slots 50, and these pins are so constructed and arranged that when the two parts of the link are in alinement the pins will be at the ends of the slots to thereby limit the pivotal movement of the parts relative to each other in one direction and permit and limit the movement of the parts in the opposite direction. A rivet 52 is extended through the entire central portion of the disk-shaped parts 48 and 49 and through the wheel 47, and 53 indicates a sleeve which surrounds the rivet 52 and is placed in position with its ends engaging the inner faces of the disk-shaped parts 49 to thereby prevent them from binding against the outer faces of the parts 48. It is now obvious that the links may fold or kink laterally by their connections at their ends and also that they may fold or kink vertically in one direction by means of their pivotal connections at their central portions, and hence the links may travel around in the upper track and over the downward bend in the rear portion of the track and also in the forward end of the track when it is lowered. Furthermore, when traveling through the straight portions of the track the weight of the links is supported upon the rollers 47, while the wheels 46 will at the same time extend at right angles to the said rollers and engage the parallel sides of the track to facilitate the operation of the chain.

By reason of the means for limiting the movement of the central joint so that the ends may not move upwardly the following useful function is attained: When the links of the chain pass beyond the chain-propelling wheel, they are pushed through the track, and hence when they reach the downwardly-inclined portion of the track at the point where the link turns laterally the central wheels are forced upwardly, and the weight of the chain need not be supported on said central wheels. When they are moving laterally, however, at the forward end of the track and at all other times these central wheels advance longitudinally and the weight of chain is supported by the rollers engaging the bottom of the track and the friction minimized.

I have provided means for causing the links to kink or fold in such a manner as to withdraw the arms 54, which are formed on or fixed to each alternate link to be withdrawn into the track, as follows: On each of the links that is not provided with an arm 54 I have formed a lug 55, and 56 indicates a small roller supported in the track at a point near the shoulder 57 at which the track is widened. This roller is so arranged and disposed with relation to the links and the said shoulders that when the lug 55 strikes this roller the forward end of the link to which the said lug is placed is ready to enter the widened portion of the track. Then as the chain is farther advanced this link is started to fold or kink at this point. It is understood that the entire chain is of such a length that it must fold or kink at one place within the track, and hence it is only necessary to start the chain to fold or kink and when started properly it will fold or kink sufficiently to entirely withdraw the arms 54 into the track.

In practical use it is obvious that by means of the mechanism just described the stalks are deposited into a shock-former at the rear end of the machine which is placed at an angle of about forty-five degrees, and when the stalks are so placed it is obvious that no means need be provided for holding them in an upright position, such as is necessary in a machine where the stalks are bound when standing vertical. Furthermore, a shock may be made more compact and uniform when the stalks are laid in this position. By the arrangement and construction of parts whereby the forward portion of the upper track, together with its guide-rail, may be moved vertically the operator may when he sees one or more stalks lying down in the field lower the track and guide-rail sufficiently so that the conveyer-fingers will engage the stalks that are lying down and carry them to a substantially upright position, so that they may be placed in the shock.

Having thus described the machine, what I claim as new, and desire to secure by Letters Patent of the United States therefor, is—

1. In a corn-harvester, the combination of a conveyer-track, a conveyer therein, means for driving said conveyer, a conveyer-track above the first and having its rear end inclined downwardly and rearwardly, a conveyer mounted in this upper track, means for driving same, and a shock-holder at the rear of the machine arranged at a rearwardly-inclined angle to receive the stalks of corn placed therein by the conveyers.

2. In a corn-harvester, the combination of a conveyer-track, a conveyer therein, means for driving the conveyer, a second conveyer-track arranged above the first with its rear end projecting rearwardly beyond the lower track and inclined downwardly, a conveyer in this upper track, means for driving same and a shock-holder to receive the stalks in a rearwardly-inclined position as they are delivered from the said conveyers, for the purposes stated.

3. In a device for engaging standing corn-stalks and after they are severed conveying them in a substantially upright position to the shock-holder of a corn-harvester or similar machine, the combination of a hollow continuous track, a hinge-joint in both sides of the track near its forward end whereby the forward section is made capable of a vertical movement independent of the main portion, means for moving this hinged portion, an endless conveyer-chain in said track, said chain comprising a series of links pivotally connected at their ends and capable of movement relative to each other in a horizontal plane, a joint in the central portion of each link to permit a movement of the parts in a vertical plane, means for preventing the ends of the links from moving upwardly beyond a position in which the parts are substantially in alinement with each other, for the purposes stated.

4. A conveyer-chain comprising a series of links pivotally connected at their ends, a joint in the central portion of each link to permit the ends to move relative to each other in a plane at right angles to the aforesaid joint, means for limiting the movement of said latter joint in one direction beyond a position of alinement with the ends, and a roller at said latter joint substantially as and for the purposes stated.

5. In a corn-harvester, the combination of a continuous hollow track widened at one or more points and bent or inclined in directions substantially at right angles to each other, a chain in the track of a length greater than the distance around the track so that it must fold or kink at one point, and having alternate joints capable of folding in opposite directions, antifriction-rollers at said joints to engage the sides, top and bottom of the track at various points and means for pushing the chain through the track so that it may kink or fold, substantially as set forth.

6. In a corn-harvester, the combination of a continuous hollow track bent downwardly at its forward and rear ends and widened at the said rearward downwardly-bent portion, a chain in the track of a length greater than the distance around the track so that it must kink or fold at one point, joints in the alternate links of said chain designed to move in directions at right angles to each other, antifriction-rollers in said joints to engage the interior of the track, means for limiting the movement of the vertically-movable joints whereby they may bend upwardly but not downwardly beyond a position of alinement, and means for pushing the chain into the said widened portion of the track, so that the chain will rise above the bottom of the track to prevent a dragging of the rollers on the bottom when the links stand at an angle relative to the outer wall of the track, for the purposes stated.

7. In a corn-harvester, the combination of a continuous hollow track having both laterally and vertically inclined portions and also having a widened portion and a slot in the outer side of the track, except at said widened portion, a series of link-sections each having a bifurcation in each end extended at right angles to each other, an antifriction-roller at each joint also extended at right angles to each other, pivots for connecting the joints and rollers as set forth, said links being sufficient to form a chain longer than the distance around the track so that the chain must kink or fold at the widened portion of the track - fingers on the chain to project through the slot and a single sprocket-wheel for driving the chain, for the purposes stated.

8. In a corn-harvester, the combination with an endless conveyer-track, of a conveyer-chain composed of a series of links pivotally connected at their meeting ends to be capable of movement relative to each other in a horizontal plane, rollers between the meeting ends of the links arranged in a horizontal plane, a joint formed in the central portion of each link to permit the parts of the link to move vertically relative to each other, means for limiting the movement of the inner or jointed ends of these parts in a downward direction below a position in alinement with each other, and a roller interposed at this joint to stand in a vertical plane, and conveyer-fingers formed on the links, substantially as and for the purposes stated.

9. In a corn-harvester, the combination of a conveyer-track widened at its rear turn, a roller fixed within the track near this rear turn, an endless conveyer-chain of a length greater than the distance around the track so that it must kink or fold at some point within the track, and composed of a series of links pivotally connected to be capable of movement relative to each other in a horizontal plane, rollers interposed between the links in a horizontal plane to engage the sides of the track at its narrowest point, conveyer-fingers formed on each alternate link to project outwardly from the track, a lug formed on the links not having the conveyer-fingers and designed to be engaged by the said roller, a joint in the central portion of each link arranged to permit the ends of the link to move in a vertical plane with relation to each other, means for limiting this vertical movement in a downward direction beyond the position in which the ends are in alinement, and rollers in each of these joints, in a vertical position, substantially as and for the purposes stated.

10. In a corn-harvester, the combination of a suitable frame, an axle rotatably mounted therein, two traction-wheels fixed to the axle, cutting mechanism at the forward end of the machine, a lower endless conveyer-track connected with the frame with its part in which the conveyer moves rearwardly extended diagonally across the frame, a conveyer therein having the conveyer-fingers projecting outwardly therefrom, a second conveyer-track above the first inclined diagonally across the machine-frame, and a shock-holder arranged in the rear of the machine-frame and directly back of the same wheel that is encircled by the lower track to thereby provide means whereby the weight of the machine is thrown over one of the wheels thereof, and a tongue connected with the machine-frame between the cutting mechanism and the wheel that is encircled by the lower track for the purpose of preventing side draft, substantially in the manner set forth and for the purposes stated.

WILLIAM HENRY GRAY.

Witnesses:
ROY EDISON LAFFERTY,
GEO. DANFORTH.